United States Patent [19]
Coyle et al.

[11] Patent Number: 5,367,653
[45] Date of Patent: Nov. 22, 1994

[54] RECONFIGURABLE MULTI-WAY ASSOCIATIVE CACHE MEMORY

[75] Inventors: William E. Coyle, Cary; David W. Nuechterlein, Durham; Kim E. O'Donnell; Thomas A. Sartorius, both of Raleigh; Kenneth D. Schultz, Cary; Emmy M. Wolters, Raleigh, all of N.C.

[73] Assignee: International Business Machines Corporation, Armonk, N.Y.

[21] Appl. No.: 813,971

[22] Filed: Dec. 26, 1991

[51] Int. Cl.⁵ .............................. G11C 13/00
[52] U.S. Cl. ................... 395/400; 395/425; 364/264.7; 364/243.41; 364/927.2
[58] Field of Search .............. 395/425; 364/DIG. 1

[56] References Cited

U.S. PATENT DOCUMENTS

| | | | |
|---|---|---|---|
| 4,195,342 | 3/1980 | Joyce et al. | 395/425 |
| 4,430,712 | 2/1984 | Coulson et al. | 395/600 |
| 4,503,501 | 3/1985 | Coulson et al. | 395/425 |
| 4,736,293 | 4/1988 | Patrick | 395/425 |
| 4,788,656 | 11/1988 | Sternberger | 395/275 |
| 4,853,846 | 8/1989 | Johnson et al. | 395/325 |
| 5,014,195 | 5/1991 | Farrell et al. | 395/425 |

FOREIGN PATENT DOCUMENTS 0285172 3/1988 European Pat. Off.
0325420 7/1989 European Pat. Off.

OTHER PUBLICATIONS

Cache Reconfiguration, J. Hrustich et al., IBM Technical Disclosure Bulletin, vol. 23, No. 9, Feb. 1981.
*Memory Organization, Computer System Architecture*, M. M. Mano, Second Edition, Prentice-Hall, Inc., pp. 478–521.

*Primary Examiner*—Joseph L. Dixon
*Assistant Examiner*—Nu Nguyen
*Attorney, Agent, or Firm*—Bell, Seltzer, Park & Gibson

[57] ABSTRACT

A reconfigurable set associative cache memory can be reconfigured from $2^x$ way to $2^y$ way set associative cache memory by effectively merging a predetermined number of least significant bits of the tag field of the main memory address with the line field of the main memory address. The effective merging is provided by logically merging least significant bits of the tag field with a reconfiguration designation. As a result, $Y-X+1$ different configurations of cache memory can be obtained using the Y-X least significant bits of the tag field merged with the cache memory address.

10 Claims, 7 Drawing Sheets

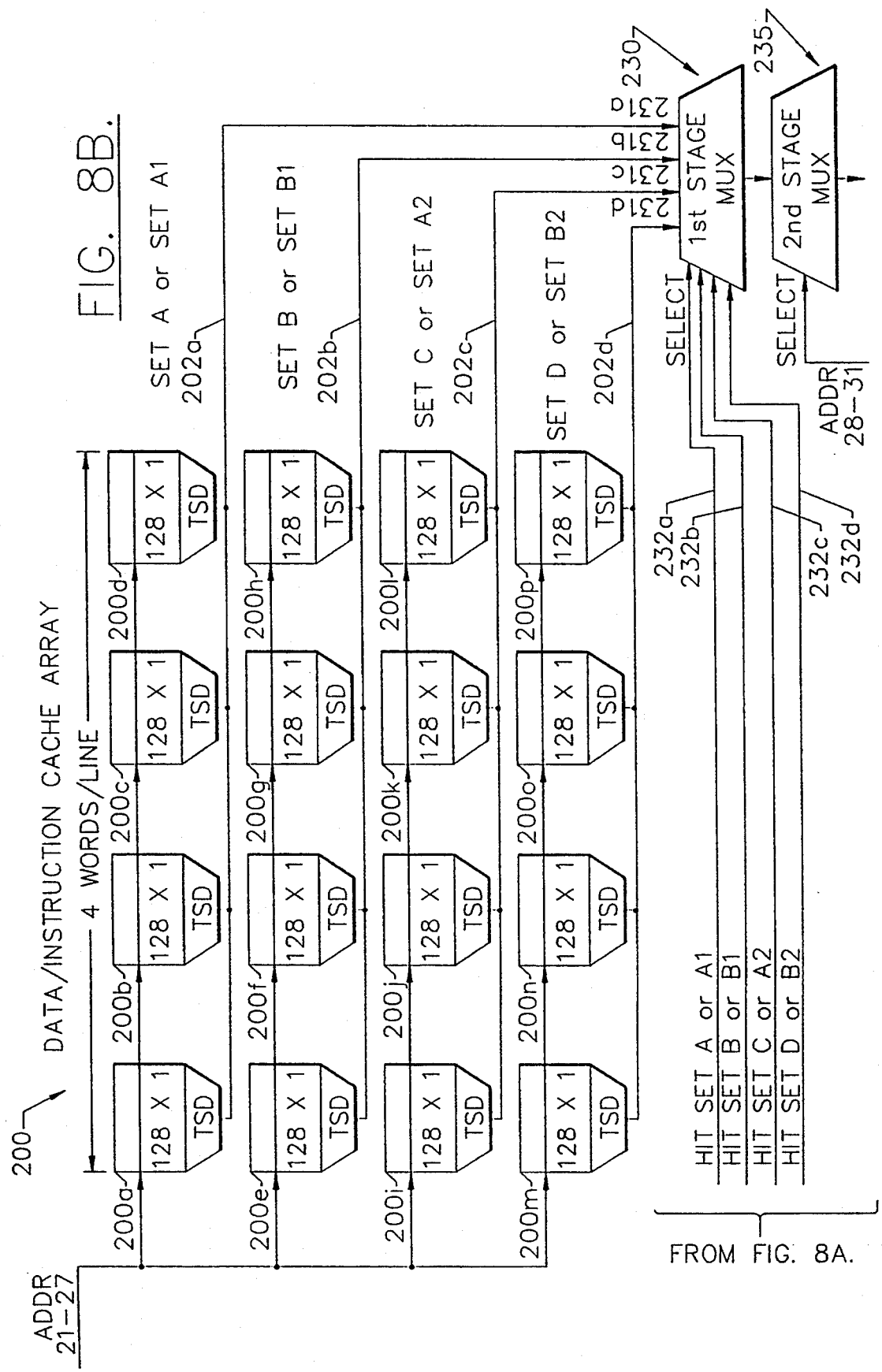

RECONFIGURABLE MULTI-WAY ASSOCIATIVE CACHE MEMORY

FIELD OF THE INVENTION

This invention relates to cache memory, and more particularly to cache memory which is reconfigurable to accommodate differing operational requirements.

BACKGROUND OF THE INVENTION

Cache memory has long been used in data processing systems to decrease the memory access time for the central processing unit (CPU) thereof. A cache memory is typically a relatively high speed, relatively small memory in which active portions of program instructions and/or data are placed. The cache memory is typically faster than main memory by a factor of 5 to 10 and typically approaches the speed of the CPU itself. By keeping the most frequently accessed instructions and/or data in the high speed cache memory, the average memory access time will approach the access time of the cache.

The active program instructions and data may be kept in a cache memory by utilizing the phenomenon known as "locality of reference". The locality of reference phenomenon recognizes that most computer program instruction processing proceeds in a sequential fashion with multiple loops, and with the CPU repeatedly to a set of instructions in a particular localized area of memory. Thus, loops and subroutines tend to localize the references to memory for fetching instructions. Similarly, memory references to data also tend to be localized, because table lookup routines or other iterative routines typically repeatedly refer to a small portion of memory.

In view of the phenomenon of locality of reference, a small, high speed cache memory may be provided for storing a block of data and/or instructions from main memory which are presently being processed. Although the cache is only a small fraction of the size of main memory, a large fraction of memory requests will locate data or instructions in the cache memory because of the locality of reference property of programs. In a CPU which has a relatively small, relatively high speed cache memory and a relatively large, relatively low speed main memory, the CPU examines the cache when a memory access instruction is processed. If the desired word (data or program instruction) is found in cache, it is read from the cache. If the word is not found in cache, the main memory is accessed to read that word, and a block of words containing that word is transferred from main memory to cache memory. Accordingly, future references to memory are likely to find the required words in the cache memory because of the locality of reference property.

The performance of cache memory is frequently measured in terms of a "hit ratio". When the CPU references memory and finds the word in cache, it produces a "hit". If the word is not found in cache, then it is in main memory and it counts as a "miss". The ratio of the number of hits divided by the total CPU references to memory (i.e. hits plus misses) is the hit ratio. Experimental data obtained by running representative programs has indicated that hit ratios of 0.9 (90%) or higher are needed to justify the search time to determine a hit or miss because the search time is added to the normal memory access time in the case of a miss. With such high hit ratios, the memory access time of the overall data processing system approaches the memory access time of the cache memory, and may improve the memory access time of main memory by a factor of 5 to 10 or more. Accordingly, the average memory access time of the data processing system can be improved considerably by the use of a cache.

Data processing systems are typically used to perform many independent tasks. When a task is first begun, the hit ratio of the cache is typically low because the instructions and/or data to be processed will not be found in the cache. Such a cache is known as a "cold" cache. Then, as processing of a task continues, more and more of the instructions and/or data which are needed may be found in the cache. The cache is then referred to as a "warm" cache because the hit ratio becomes very high.

In order to maximize the hit ratio, many data processing system architectures allow system control over the use of the cache. For example, the cache may be used to store instructions only, data only, or both instructions and data. Similarly, the cache may be controlled to lock a particular line or page in the cache, without allowing overwrites. The design and operation of cache memory in a data processing architecture is described in detail in Chapter 12 of the textbook entitled "Computer System Architecture") by Mano, Prentice-Hall, Inc. (Second Edition, 1982). FIGS. 1–4, described below, are adapted from Chapter 12 of Mano.

Various techniques are known for mapping blocks of main memory into cache memory. Typical forms of mapping include direct, 2-way, and 4-way mapping. The form of mapping can impact the performance of the cache.

One method of mapping main memory and cache addresses is direct mapping. An example of direct mapping will now be discussed with reference to FIG. 1. The numeric values are in octal representation, i.e. one octal digit represents three bits. In FIG. 1, a 15-bit (five octal digit) main memory address is divided into two fields, an index field comprised of the nine least significant bits (three octal digits) and a tag field comprised of the remaining six bits (two octal digits). The entire 15-bit address, i.e. tag and index bits combined, is needed to access main memory, while only the 9-bit index is needed to access cache memory. The general case provides $2^k$ words in cache memory and $2^n$ words in main memory, wherein the n-bit main memory address is divisible into two fields, a k-bit index field and a n-k bit tag field. Direct mapping cache uses the n-bit address formed by combining the k-bit index field and the n-k bit tag field to access main memory and the k-bit index to access cache memory.

Referring to FIG. 2, each word stored in cache consists of a data word and its associated tag. It will be understood by those having skill in the art that program instructions, data, or both program instructions and data can be stored in cache memory. For purposes of simplification, it is assumed that data is stored in cache. A new data word is stored in cache by storing the data and the associated tag. In this example, the 12-bit data word is represented by four octal digits and the associated 6-bit tag is represented by two octal digits. Cache memory is accessed using the k-bit index field of the main memory address to address into cache. The n-k bit tag field of the main memory address is then compared with the tag associated with the word stored at the cache memory location identified by the k-bit cache address. If the two tags match, a hit results and the data word is in cache. In the event the two tags do not match, a miss results and the required data word must be read from main memory and stored in cache memory together with the associated tag using an appropriate replacement algorithm.

Still referring to FIG. 2, a specific example of direct mapping will now be described. The address, data and tag values are represented in octal representation. A word having a value of 1220 is stored at main memory address 00000 and is also stored in cache memory at index (cache) address 000. Tag 00 is associated with data 1220 and stored in cache memory. The CPU desires to access the data stored at main memory address 02000 and the index (cache) address 000 corresponding to main memory address 02000 is used to access cache memory. Tag 00 associated with the data word stored at cache address 000 is then compared to tag 02 of main memory address 02000. Since the two tags are not equal, a miss results and main memory must be accessed. The data word 5670 is then accessed by the CPU at main memory address 02000 and the data word and associated tag, in this case data 5670 and tag 02, are ultimately stored in cache memory at a cache memory address selected by an appropriate replacement algorithm.

Referring to FIG. 3, fully associative mapping for cache memory will now be described. All numeric values are in octal representation for this description of associative mapping. The 15-bit CPU address is stored in an argument register. The associative cache memory stores both the main memory address and the data word, thus allowing a word from main memory to be stored in any location in cache. In operation, a 15-bit main memory address is loaded into the argument register and the contents of the argument register is compared with the main memory addresses stored in associative cache memory. If the contents of the argument register equals one of the main memory addresses stored in cache memory, the 12-bit (four octal digit) data word associated with the matching main memory address stored in cache memory is accessed by the CPU for processing. In the event no match occurs, i.e. a miss results from the comparison, main memory must be accessed and the address/data pair from main memory is loaded into the associative cache memory using an appropriate replacement algorithm.

Referring to FIG. 4, set-associative mapping for cache memory will now be described. Set-associative mapping permits the storage of two or more words in cache memory at the same index (cache) address. Thus, each cache memory word stores two or more words from main memory at the same cache address. The distinct data words stored in cache at the same index (cache) address are each associated with a tag. The number of tag/word pairs stored in one word of cache forms a "set". A set of size two is illustrated in FIG. 4 because two data words and their associated tags, i.e. two tag/word pairs, are stored at each index (cache) address.

In FIG. 4, each 6-bit tag field is represented as two octal digits, and each 12-bit data word is represented as four octal digits. Since there are two 18-bit tag/data pairs, i.e. a set size of two, the example in FIG. 4 has a 36-bit cache memory word.

It is possible to have multiple cache memory words located at one index (cache) address. A cache memory which has multiple cache words at one cache address is referred to as a multi-way cache. Thus, if there were two cache words at each cache address, the cache would be a 2-way associative cache memory.

The example in FIG. 4 provides a 9-bit cache address which addresses $2^9 = 512$ cache words. Thus, the cache memory is 512×36 in size. The cache can store 1024 words from main memory since each cache word contains two main memory data words. Generally, a set-associative cache having set size k will accommodate k words of main memory in each word of cache.

The set associative cache memory represented in FIG. 4 will now be described with reference to actual values. The words stored at main memory addresses 01000 and 02000 are stored in cache memory at index address 000. Similarly, the words stored in main memory at main memory addresses 02777 and 00777 are stored in cache memory at cache address 777. Thus, the least significant nine bits, i.e. the three least significant octal digits, are the index into cache memory. The next six higher significant bits, represented as the next two higher significant octal digits, is the tag associated with each data word which is stored in cache memory. The CPU processes a memory reference by using the index field of the main memory address as the cache memory address. The tag field of the main memory address is then compared against each tag associated with each data word stored at the particular cache address in associative cache memory. If the comparison results in a match, i.e. a hit, that data word is used by the CPU. In the event no match occurs, i.e. a miss occurs, the main memory address must be used to access main memory and the accessed data word from main memory is loaded into cache using an appropriate replacement algorithm.

Referring to FIG. 5, a 4-way set associative cache is illustrated because there are four cache words, i.e. four sets, having the same cache address. Each set has a set size of four lines, and each cache memory line stores four 32-bit main memory words. A further example is shown in FIG. 6 wherein a 2-way set associative cache is illustrated with each set having a size of eight. Each "data cell" in the 4-way set associative cache illustrated in FIG. 5 and in the 2-way set associative cache illustrated in FIG. 6 has a tri-state driver ("TSD"). The tri-state drivers maintain the outputs of the data-cells in a high impedance state which permits a direct wire connection from many outputs, i.e. data cells, to a common bus line with only one output, i.e. data cell, having access to the common bus at any given time. The operation of tri-state drivers is generally known to those having skill in the art.

Different configurations of cache memory are used for different applications, including direct, 2-way and 4-way mapping, in order to increase performance for the particular application. For example, differences which exist between data and instruction memory access patterns permit smaller, partitioned (i.e. instructions and data) caches to achieve higher hit ratios. Also, 2-way associative cache is often adequate for instruction caches; however, 4-way associative cache often provides better performance for a data cache.

Although certain configurations provide better performance than other configurations depending on the type of processing, e.g. instruction or data, the type of configuration necessary to obtain the best performance is dependent upon the application code being processed. Therefore, there is a need for a reconfigurable cache which reconfigures the size/type/way of the cache.

Many techniques have been used for reconfiguring cache memories. For example, U.S. Pat. No. 4,853,846 to Johnson et al. discloses a bus expander with logic for virtualizing single cache control into dual channels with separate directories and prefetch for different processors. Johnson et al. provides programmability for the number of sets in cache memory, distinct from the number of ways, and allows for the modification of cache directory operation based upon configuration. The operation of the cache directory is changed such that it splits the cache into two caches which serve two processors rather than one. Johnson et al. also permits multiple simultaneous comparisons and adjusts the number of sets based upon a decoding of address bits. Johnson permits adjustment of the cache, set size and number of sets from one to sixty-three. Although Johnson et al. discloses reconfiguration of the set size and number of sets of a cache memory, the cache of Johnson et al. effectively remains 4-way set associative.

Another technique for configuring cache memories is disclosed in European Patent Application 325420 to Baror. Baror discloses a multi-configurable cache, the configuration being dependent upon setting of cache option bits. The multi-configurable cache can be used as either data or instruction cache and can be organized as 2-way set associative or direct mapped cache memory. The two different configurations provide for location of the associated memory array within a programmable cache unit in a first configuration and location of the associated memory array outside of the programmable cache unit in a second configuration.

Other approaches to cache reconfiguration are oriented towards memory interleaving and/or set size/line length variation. For example, U.S. Pat. No. 4,788,656 to Sternberger discloses a cache memory and preprocessor. Sternberger provides reconfiguration of line size including the ability to dynamically change the line size from 16-bit to 8-bit, thereby allowing the cache to be either 2K or 4K in size. This reconfiguration of line size accommodates processors/memories that have an 8 bit wide path. Sternberger creates the memory interleaving necessary to switch from 8-bit to 16-bit lines by distinguishing between the acquisition and retrieval mode. When the modes are changed, address lines A1 through A11 become connected to RAM address lines A0 through A10 and address line A0 is connected to the chip enable line. This permits reconfiguration from a 2K byte by 16-bit space during the acquisition mode, to a 4K byte by 8-bit space during the retrieval mode, wherein the high and low bytes of the previously defined 16-bit words are interleaved.

U.S. Pat. Nos. 4,430,712 and 4,503,501 to Coulson et al. disclose adaptive domain partitioning of cache memory space to vary cache set/line size. A direct map cache with a variable set size/line length is provided to match line size with the file record size. This effectively provides a variable length line direct map cache.

A further technique for obtaining multi-configurable cache memory through interleaving memory and varying line size is disclosed in U.S. Pat. No. 4,195,342 to Joyce et al. The multi-configurable cache system of Joyce et al. discloses a multi-configurable cache store control unit for varying the line size of a cache to retrieve one or two items from memory based upon configuration. This method also permits interleaving of memory to produce a 2-way set associative cache.

A memory interleaving technique is disclosed in U.S. Pat. No. 4,736,293 to Patrick for interleaving two memory parts to produce a 2-way interleaved set associative memory. Patrick does not address reconfigurability of set associative cache memory but rather provides a mechanism for retaining the efficiency of fine interleaving by partitioning the sets using a fine interleaving rather than the traditional block approach, where a block of contiguous memory equal to the set size is assigned to a set.

Finally, a technique for providing cache reconfiguration is disclosed in IBM Technical Disclosure Bulletin, Volume 23, No. 9, February 1981 by Hrustich and Sitler. Hrustich and Sitler do not dynamically vary the associativity of cache memory, but rather provide a divisible cache using address lines to recover from hardware failures. This is accomplished by using only a portion of the total cache, and certain address lines (A8, A9) are held in a steady state. In the event a hardware failure is detected in a portion of the cache, these address lines are modified to permit use of a previously unused portion of cache. This type of reconfiguration effectively divides the cache into virtual pieces and only allows one piece to be used. In the event a selected portion proves to be nonfunctional, a different portion is used. The cache configuration disclosed by Hrustich and Sitler provides a permanent 8-way associative cache memory.

The above survey indicates that to the best of Applicant's knowledge, the art has not yet determined how to partition set associative cache memory to permit multi-way reconfigurability of cache to change associativity. Moreover, to the best of Applicant's knowledge, the art has not suggested a method or apparatus for efficiently reconfiguring the cache memory.

SUMMARY OF THE INVENTION

It is therefore an object of the present invention to provide a method and apparatus for reconfiguring cache memory in a data processing system.

It is another object of the present invention to provide a method and apparatus for reconfiguring the number of ways of a multi-way set associative cache memory in a data processing system.

It is still a further object of the present invention to provide a method and apparatus for efficiently reconfiguring multi-way set associative cache memory with little overhead for the data processing system.

These and other objects are provided according to the present invention by reconfiguring the number of ways of multi-way associative cache using one or more of the lowest order tag bits to index into the cache. In other words, the cache is partitioned for the highest number of ways, i.e. the greatest number of sets. One or more of the least significant tag bits is merged with the line bits and used as an index into the cache. Thus, the multiple small caches, i.e. sets, are logically merged into fewer larger caches by treating the lower order tag bit as the upper order line bit.

In one embodiment of the present invention, a plurality of data elements are stored at each of a plurality of cache memory addresses in a multi-way associative cache memory. A multi-bit tag is associated with each data element. A tag responsive cache memory addressing controller is responsive to at least one tag bit of the multi-bit tag associated with a cache memory address to reconfigure the cache. The controller selects at least one data element from the plurality of data elements stored at a given cache memory address by merging at least one tag bit of the multi-bit tag with a cache memory address. In other words, the controller selects one line having a plurality of data words from each of the plurality of sets having the same cache memory address, based on the least significant tag bits. This selection logically merges the multi-way associative cache into a larger size, fewer way, associative cache.

The data processing system including the reconfigurable way, multi-way associative cache memory has a main memory in which data items are stored and retrieved at a relatively low speed. The data processing system also has an addressable associative cache memory having multi-bit addresses corresponding to low order main memory address bits. A distinct multi-bit tag, corresponding to high order main memory address bits, is associated with each cache data line stored in associative cache memory at the cache memory addresses. A tag responsive cache memory addressing controller stores data in the cache memory at reconfigured cache memory addresses. The cache memory addresses are reconfigured by merging the low order main memory address bits with at least one of the least significant bits of the multi-bit tag.

The reconfigurable multi-way controller may be implemented using minimal additional circuitry, so that minimal overhead is added to the data processing system. In particular, circuitry is provided for selectively disabling a portion of a directory (tag) array in response to at least one of the least significant tag bits of the main memory address and a reconfiguration designation. The circuitry includes one INVERTER gate, and a first set of two AND gates for selectively disabling a part of the directory (tag) array. A second set of two AND gates connected to the first set selectively prevents the operation of the selective directory disabler formed by the first set of AND gates and results in preventing the operation of the entire directory (tag) array. In addition, a comparison block is provided for comparing the tags stored in the directory (tag) array at a given cache address with the tag field of a main memory address. Accordingly, a reconfigurable way, associative cache is efficiently provided.

BRIEF DESCRIPTION OF THE DRAWINGS

FIGS. 8A and 8B, which when placed together as indicated form FIG. 8, is a detailed block diagram of the tag responsive cache memory address controller and multi-way associative cache memory according to the present invention.

DESCRIPTION OF A PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so well that this disclosure will be thorough and complete, and will fully convey the scope of the invention to those skilled in the art. Like numbers refer to like elements throughout.

Figure 1:
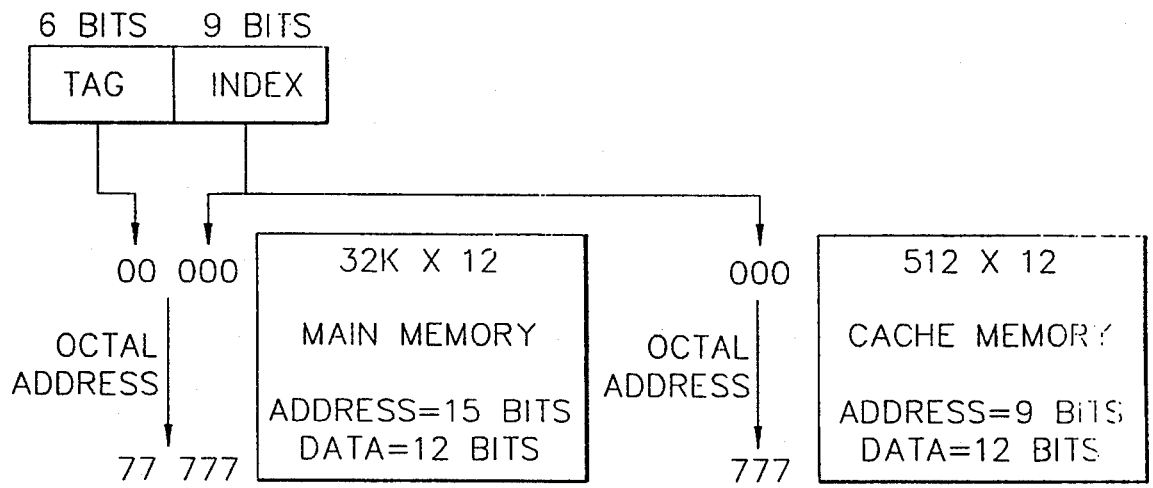
FIG. 1 is a block diagram illustrating a known data processing system including main and cache memories.
Figure 2:
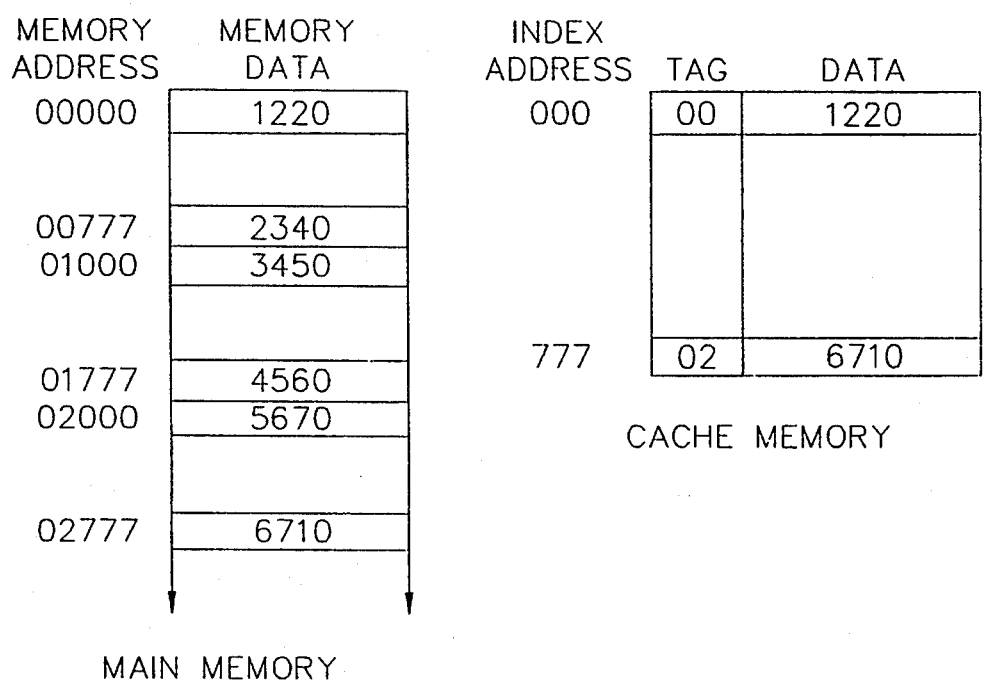
FIG. 2 is a block diagram illustrating a known direct mapping cache organization for a data processing system.
Figures 3, 4:
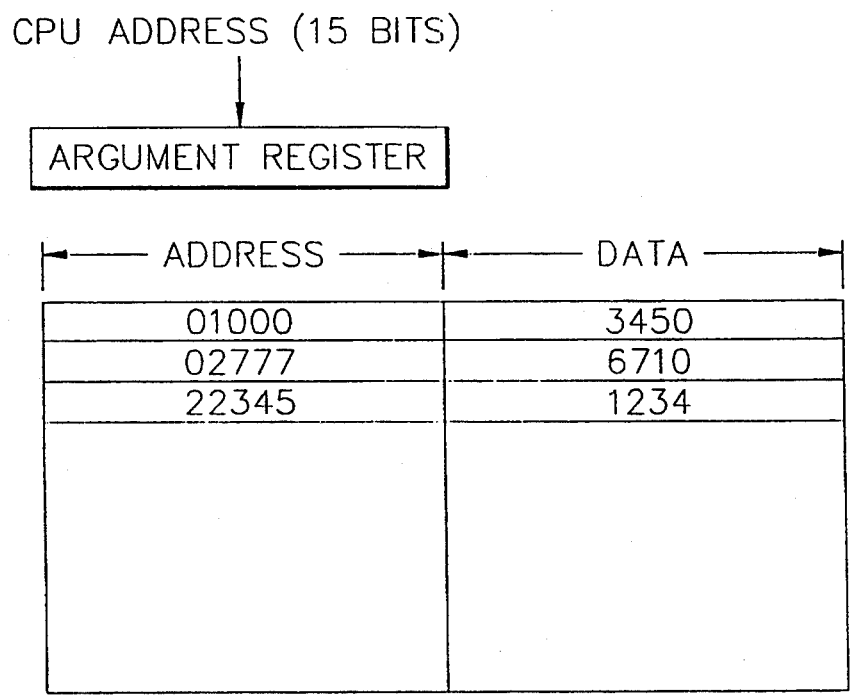
FIG. 3 is a block diagram illustrating a known associative mapping cache organization for a data processing system.
FIG. 4 is a block diagram illustrating a known set associative mapping cache organization for a data processing system.
Figure 5:
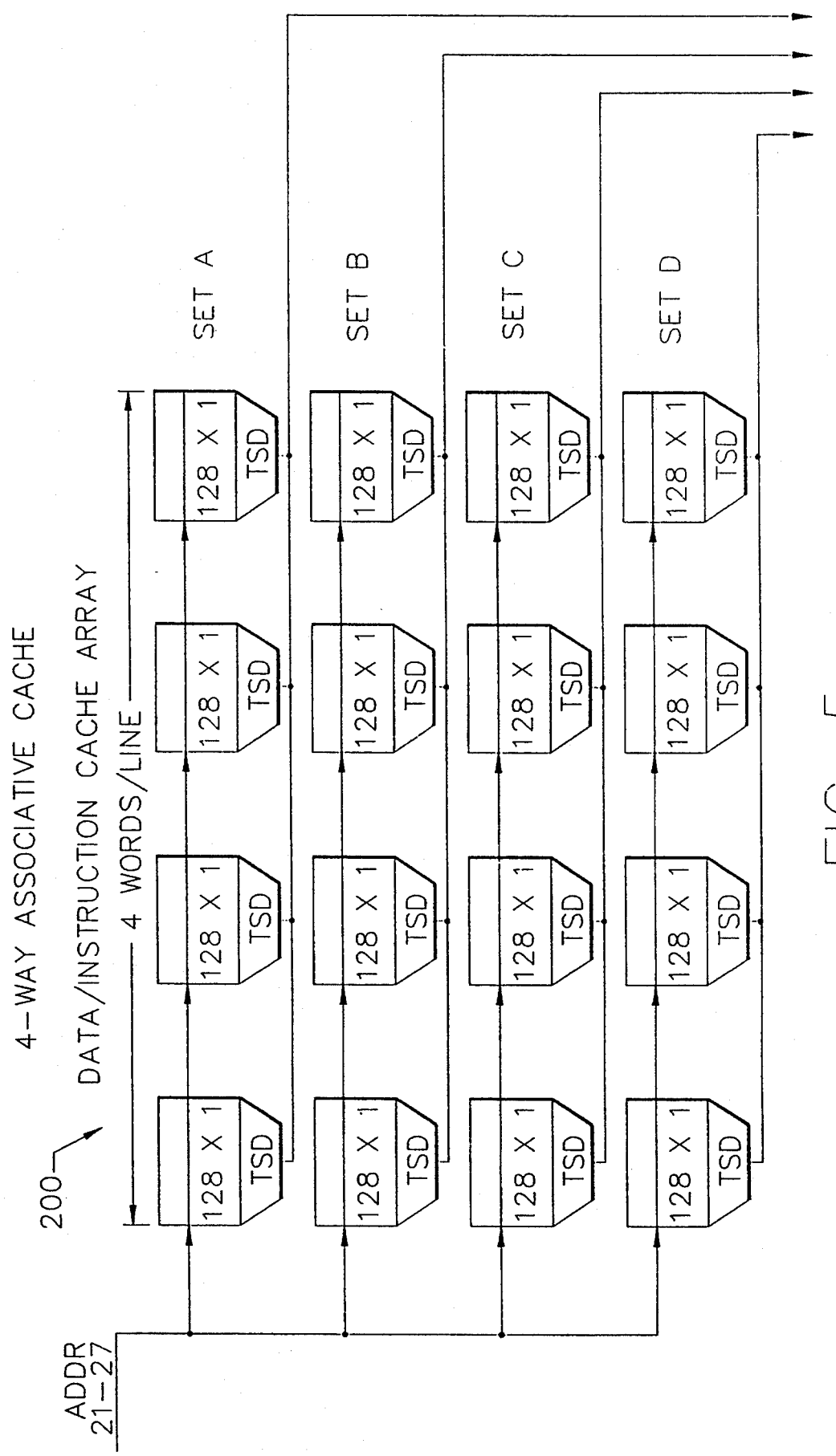
FIG. 5 is a block diagram illustrating a known 4-way associative data/instruction cache memory array.
Figure 6:
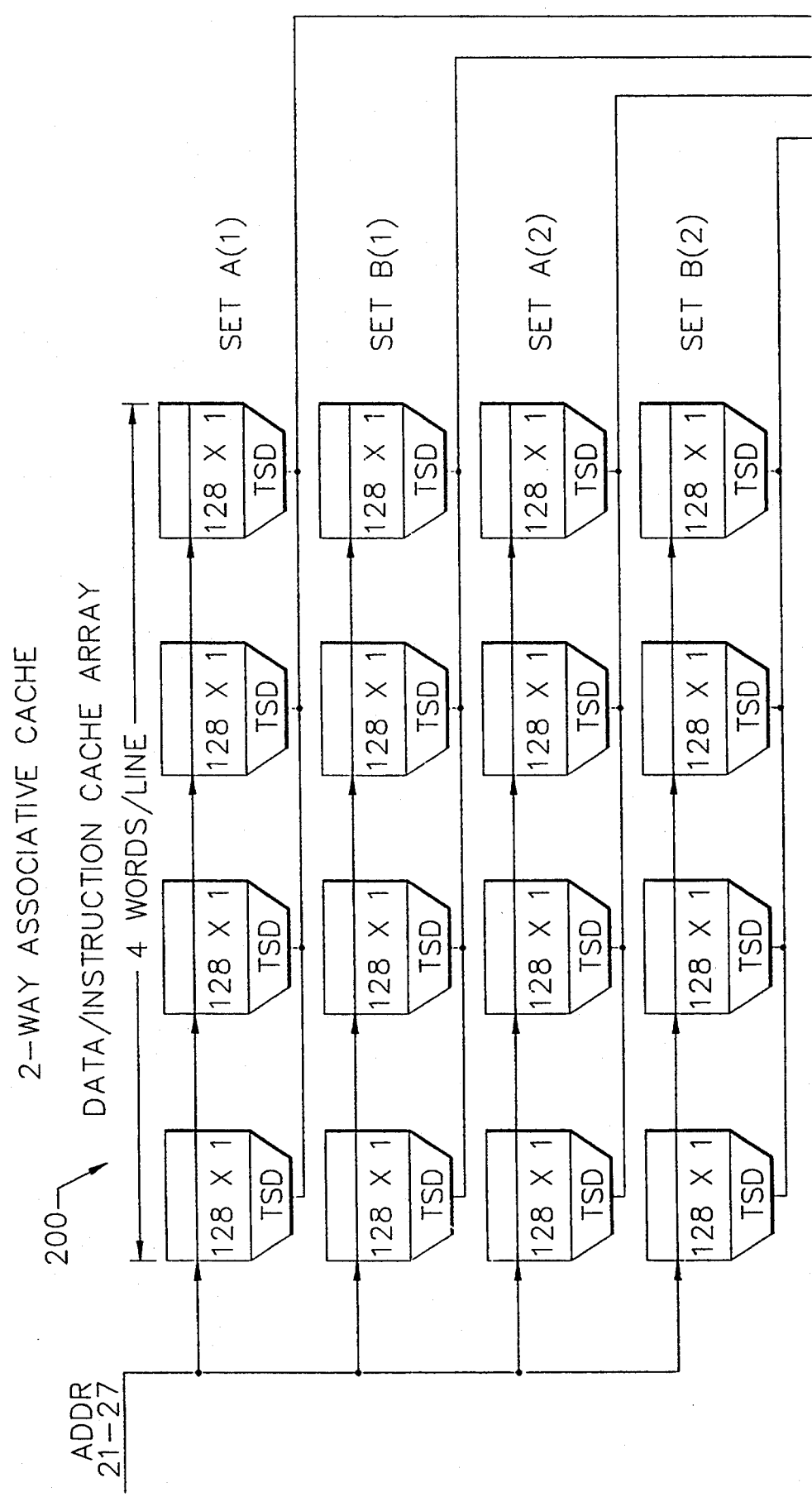
FIG. 6 is a block diagram illustrating a known 2-way associative data/instruction cache memory array.
Figure 7:
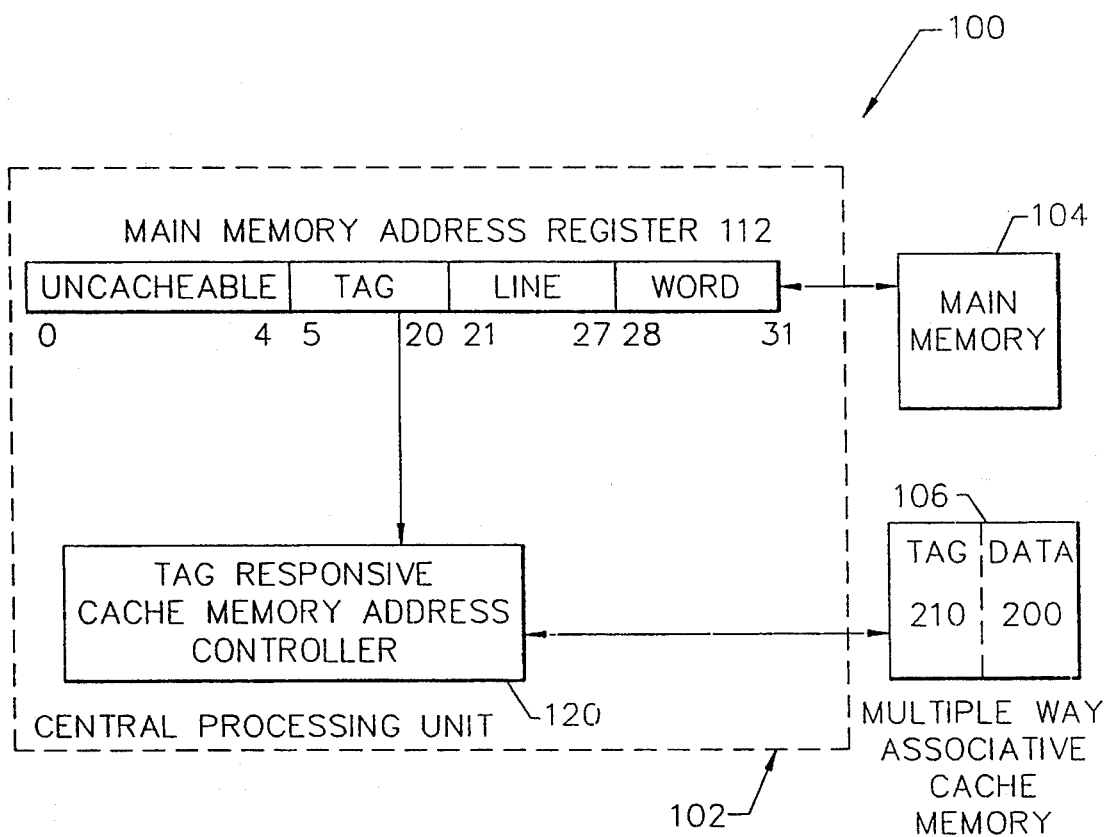
FIG. 7 is a schematic block diagram illustrating a data processing system including a tag responsive cache memory address controller according to the present invention.

Referring now to FIG. 7, a data processing system including a tag responsive cache memory address controller and multiple way associative cache memory will now be described. The tag responsive cache memory address controller allows the number of ways of the multi-way set associate cache to be varied under control of the data processing system.

As shown in FIG. 7, data processing system 100 includes a central processing unit (CPU) 102 which communicates with a main memory 104 and a multiple way associative cache memory 106. It will be understood by those having skill in the art that CPU 102 may include a plurality of processors in a multiprocessing system. In many typical embodiments, main memory 104 comprises Dynamic Random Access Memory (DRAM) and cache memory 106 comprises Static Random Access Memory (SRAM). As is well known to those having skill in the art, cache memory 106 is typically smaller than main memory 104, but is typically faster than main memory 104. Cache memory 106 is also typically more expensive than main memory 104 on a per byte basis.

It is understood by those skilled in the art that CPU 102 may also include an arithmetic logic unit and communication means for transferring data between components of CPU 102, as well as other components.

Data/instructions as well as tags are stored in associative cache memory 106. Data, program instructions or data and program instructions can be stored in cache memory. The data and/or instructions stored in cache memory shall hereinafter be referred to as "data". The data and associated tags may be stored in either a single associative cache memory or in separate cache memories. Either cache memory organization is known to those having skill in the art. An address of a word of main memory is maintained by the central processing unit 102. The main memory address may be maintained in main memory address register 112 or other known forms of storing addresses which identify locations of data stored in main memory.

The main memory address stored in main memory address register 112 is divisible into several components. Generally, low order main memory address bits correspond to a cache memory address, i.e. line, and high order main memory address bits correspond to a tag which is associated with the main memory word stored at the main memory address and ultimately with the main memory word stored at the corresponding cache memory address. In particular, main memory address bits 28–31 identify one of many main memory words stored at a given cache memory address. Main memory address bits 21–27 is a cache address used to access a line in cache memory. Main memory address bits 5–20 represent a tag which corresponds to the main memory word which is ultimately stored at the cache address of main memory address bits 21–27. Finally, the most significant main memory address bits 0–4 determine whether the address is cacheable or uncacheable, and are decoded to enable or disable the cache access.

The tag responsive controller 120 combines low order main memory address bits 21–27, i.e. the line field, with at least one of the least significant bits of the tag field of the main memory address, in order to access the associative cache memory. It should be noted that no bits of the tag field are combined with the line field in the case where the cache is configured in its maximum-way capacity. This merging by the tag responsive controller of the present invention allows for cache reconfiguration to permit one associative cache memory to be configured in different ways from a smaller size, larger way, associative cache memory to a larger size, fewer way, associative cache memory.

Thus, the present invention provides a reconfigurable associative cache memory which supports variability of $2^X$ way to $2^Y$ way associativity, where $Y>X$, by configuring the cache for $2^Y$ way associativity, i.e. maximum associativity. The number of different possible configurations is equal to $Y-X+1$. The number of bits necessary to reconfigure the associative cache memory to obtain any one of the possible configurations is defined by $\log_2(Y-X+1)$ rounded up to an integer. The present invention further qualifies addressing of the cache by using the $Y-X$ least significant bits of the tag field of the effective address, said tag field being in this case main memory address bits 5–20. These $Y-X$ least significant bits of the tag field are merged with the line field of the main memory address, i.e. the cache memory address, to effectively access the multi-way reconfigurable cache memory regardless of the cache memory configuration.

A detailed embodiment of the reconfigurable associative cache memory of the present invention will now be described. In particular, operation as an associative 4-way cache memory will first be described, followed by operation of the system of the present invention as a 2-way associative cache memory, and finally the design for reconfiguring the cache memory from 4-way to 2-way will be described.

Figure 8A:
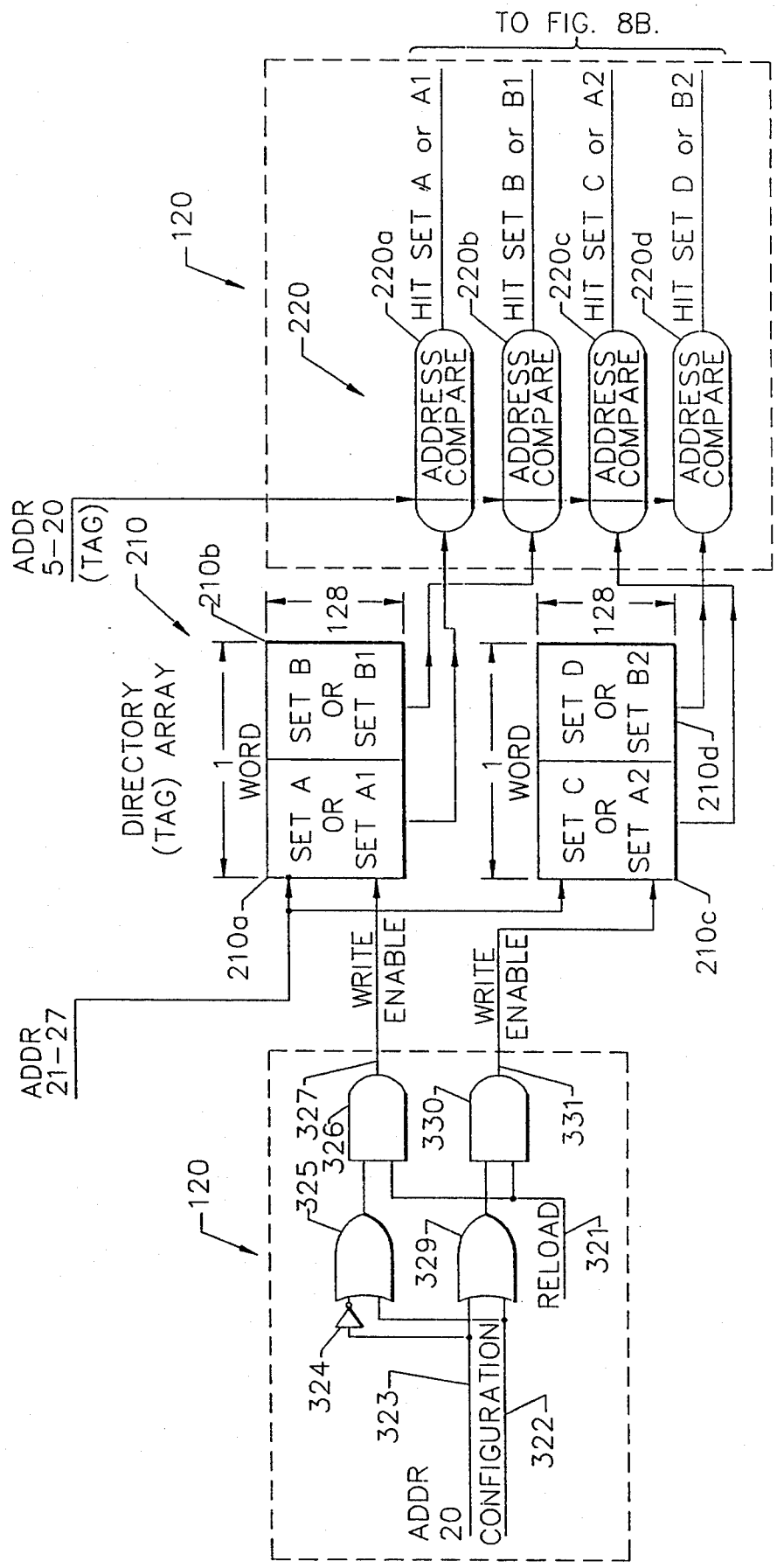

Referring to FIGS. 8A and 8B, multiple way associative cache memory 106 in the form of cache array 200, directory (tag) array 210, tag responsive cache memory address controller 120, first stage multiplexor 230, and second stage multiplexor 235 of the present invention are illustrated. Cache array 200 can store either actual data or program instructions. For purposes of simplicity, it is assumed that the contents of cache array 200 is data. Cache array 200 is illustrated as sixteen data cells arranged in an array of four rows, each having four columns, i.e. a 4×4 array. Each data cell 200a–p is capable of storing 128 words, each word being 32 bits in length. Thus, each data cell is a 128×1 cell. Each row of the data cells, i.e. data cells 200a–d, 200e–h, 200i–l, and 200m–p, is known as a "set" and stores 128 lines of data, a line consisting of four words. A 7-bit address accesses a given line of each set, i.e. row of data cells. Thus, one 7-bit address indexes one line of data from each of the four sets in cache data array 200. Each data cell has a tri-state driver, as previously described, to permit multiple data cells to be connected to a single data path. It will be understood by those having skill in the art that the numbers are used hereinabove for illustration, and any size and configuration of cache may be used.

4-Way Associative Cache Memory

Referring to FIG. 8B, the operation of 4-way associative cache memory will now be described. Cache array 200 consists of four sets, Set A, Set B, Set C, and Set D, each corresponding to one row of data cells, namely data cells 200a–d, 200e–h, 200i–l, and 200m–p, respectively. In operation, address bits 21–27 (ADDR 21–27) of the 32-bit main memory address, are applied as indexes to each of Sets A, B, C, and D, resulting in access of one line, i.e. four words, from each of the four sets. The 7-bit index is capable of addressing 128 different lines, i.e. $2^7=128$. Each word accessed from a data cell corresponding to a particular set is outputted onto the same data path. Each data cell is provided with a tri-state driver as previously described to permit the data cells for each set to access a single data path. Thus, the four 32-bit words accessed by ADDR 21–27 from data cells 200a–d in Set A are transferred on data path 202a. Similarly, the four 32-bit words accessed from data cells 200e–h in Set B are transferred on data path 202b, the four 32-bit words accessed from data cells 200i–l in Set C are transferred on data path 202c and the four 32-bit words accessed from data cells 200m–p in Set D are transferred on data path 202d.

The line of four words accessed from each of Sets A, B, C and D are entered as inputs into first stage selector (multiplexor) 230 (1ST STAGE SELECT) on input lines 231a–d. SELECT lines 232a–d are activated by the result of a hit based on the comparison of tags which indicates that the particular data desired by the central processing unit during processing is presently stored in cache memory. Only one of the four SELECT lines 232a–d can be active at any given one time. However, it is possible that none of the four select lines will be active at a given time if no "hit") is found. Output 233 of 1ST STAGE SELECT (MUX) 230 is obtained as a result of the selection by SELECT lines 232a–d of one of the lines of data entered on input lines 231a–d.

Output 233 of 1ST STAGE SELECT 230 is a line of data from one of the four Sets A, B, C and D, the line consisting of four 32-bit words. This output is entered as input to 2ND STAGE SELECT (MUX) 235, the second stage selector (multiplexor). The output of 2ND STAGE SELECT 235 is either a byte or a word which is selected from the line of four words entered into the second stage selector. The selection is a result of the selected line being connected to ADDR 28–29, i.e. address bits 28–29 of the main memory address, for selecting a word, or ADDR 28–31, i.e. address bits 28–31 of the main memory address, for selecting a byte. In other words, if a single byte is desired, all four bits, i.e. ADDR 28–31, are used to select the byte from the line of data entered into the 2ND STAGE SELECT 235. If a full 32-bit word is desired, only ADDR 28–29 of the main memory address are used to select one word from the line of data entered into the 2ND STAGE SELECT 235.

Referring to FIG. 8A, the operation of tag array 210 will now be described. The tag associated with data stored in cache array 200 at an address defined by ADDR 21–27 is stored at the same address defined by ADDR 21–27 in the tag array 210. For purposes of illustration tag array 210 is divided into two sub-arrays, i.e. a top sub-array 210a–b and a bottom sub-array 210c–d. The tag array could also be illustrated as one single array having four parts, i.e. a first, second, third and fourth part.

In the particular configuration illustrated in FIG. 8A, the tag array is divided into two sub-arrays, i.e. a top sub-array 210a–b and a bottom sub-array 210c–d, each sub-array being divided into a right part and a left part. Tag array parts 210a, 210b, 210c and 210d, each store a 16-bit tag which is address bits 5-20 of the main memory address, i.e. the tag field, for a particular data element. Each tag array part 210a–210d is capable of storing 128 tags. Thus, each tag stored in a part of tag array 210a, 210b, 210c, and 210d is uniquely associated with the four data words, i.e. line, stored in the same address location indexed by the 7-bit address (ADDR 21-27) in the associated Set A, Set B, Set C and Set D of cache array 200. For example, a particular 16-bit tag stored at address 45 in part 210a of tag array 210 is associated with the four data words, i.e. line, stored in cache array 200 in data cells 200a–d, i.e. Set A, at address 45.

The tag array also contains the State Bits, i.e. "Dirty" bits, "Valid" bits and "Replacement Identification" bits, the Replacement Identification bits being dependent upon the desired replacement algorithm, e.g. LRU (Least Recently Used). The operation of the State Bits is known to those having skill in the art, but will be briefly described below. A Valid bit indicates whether the data associated with a particular tag is valid for that tag. A Valid bit is maintained for each part 210a–d of tag array 210. The Dirty bit indicates if the data is bad, i.e. whether or not the cache data value must be written back to main memory to update the data stored in main memory. Finally, the Replacement Identification bits are used to determine which location of the cache is to be written when a word in main memory is accessed and brought into cache. In other words, this "which one to replace" field controls which field in the cache tag array is to be overwritten and also which field in the cache data array is to be overwritten. The State Bits can be maintained in a separate state array or can be maintained as a part of the tag array. The State Bits, are accessed at the same time as the tags from the tag array. The Replacement Identification bits determined by the replacement algorithm are used in the event of a miss, i.e. all hit bits ANDed with the Valid bit equal "zero".

Referring again to tag array 210 of FIG. 8A, the selection operation of tags from the tag array will now be described. As illustrated, two pairs of tags are accessed from the tag array, namely one pair from parts 210a–b of the tag array and a second pair from parts 210c–d of the tag array. Each pair is accessed by ADDR 21-27 of the main memory address. The 16-bit tag of each pair of tags is separately transferred from tag array parts 210a–d on its own data path to a compare unit. Each read or access of the tag array always results in output of four tags from the tag array. Compare block 210 consists of four compare units 220a, 220b, 220c, and 220d. The input to each of the four compare units 220a–d is one of the four 16-bit tags from tag array 210 and the 16-bit tag field from ADDR 5-20 of the main memory address. Output of each compare unit is a single bit representing whether or not the comparison of the particular tag selected from the tag array equals the tag from the main memory address, i.e. whether or not a hit occurred. Only one of the 1-bit outputs from the four compare logic functions can have a value of "1". In other words, at most, only one of the compare logic functions 210a–d can result in an equality between the tag field (ADDR 5-20) of the main memory address and the tag from the tag array. The output of the address compare logic function is a single bit and at most, only one of the single bit outputs will equal "1", i.e. HIT=1.

The four single bit outputs of compare units 220a–d are each ANDed with their particular Valid bit (not shown) in order to determine whether or not the data associated with the tag is actually valid. Only one of the four hit lines can be active, i.e. have a value of "1". The four hit lines are entered as select bits for 1ST STAGE SELECT 230 to select one of the four lines accessed from the four sets of cache data array 200.

The top sub-array 210a–b of the tag array and the bottom sub-array 210c–d of the tag array each have a write enable line. The write enable line function will be discussed with reference to the reconfiguration controller.

2-Way Associative Cache Memory

Cache array 200 for 2-way associative cache is the same as 4-way associative cache except 2-way associative cache effectively has two sets rather than four sets. The two sets for the 2-way associative cache each consist of two rows of data cells. Thus, for 2-way associative the first row comprised of data cells 200a–d is Set A1 and the third row comprised of data cells 200i–l is Set A2. Sets A1 and A2 effectively combine to form Set A. The second row comprised of data cells 200e–h is Set B1 and the fourth row comprised of data cells 200m–p is Set B2. Sets B1 and B2 effectively combine to form Set B. Therefore, Set A and Set B each effectively contain eight data cells of 128×1 words. However, since each set is comprised of two rows, there are 256 lines in each set. The present invention treats each effective set, i.e. Set A and Set B, as two physical sets, Set A1 and A2 comprising Set A and Set B1 and Set B2 comprising Set B. Therefore, only a 7-bit address is required to access each set rather than a 8-bit address. Thus, although each effective set contains eight data cells, i.e. two rows of four data cells, and would necessitate a 8-bit address to access the two rows of 128 lines, i.e. $2^8 = 256$, by treating each effective set as two separate sets, e.g. Set A1 and Set A2, only a 7-bit address is necessary to access the effective set, i.e. $2^7 = 128$.

As described above for the 4-way associate cache, the index for selecting the address location of one line in each of the four physical Sets, A1, B1, A2 and B2, is ADDR 21-27 of the 32-bit main memory address. ADDR 21-27 is applied to each of the four Sets, A1, B1, A2 and B2, resulting in selection of one line from each of the four sets. The output from each data cell in a given set is transferred onto the same data path. Thus, the four 32-bit words, i.e. line, accessed by ADDR 21-27 from data cells 200a–d in Set A1 are transferred on data path 202a. Similarly, the four 32-bit words accessed from data cells 200e–h in Set B1 are transferred on data path 202b, the four 32-bit words accessed from data cells 200i–l in Set A2 are transferred on data path 202c and the four 32-bit words accessed from data cells 200m–p in Set B2 are transferred on data path 202d.

The line of four words accessed from each of Sets A1, B1, A2 and B2 are entered as inputs into first stage multiplexor 230 on input lines 231a–d. The details of the operation of 1ST STAGE SELECT 230 and 2ND STAGE SELECT 235 is the same for 2-way associative cache as for 4-way associative cache and will not be repeated.

Referring to FIG. 8A, the operation of the tag array 210 for 2-way associative cache will now be described. Tag array 210 operates in a similar manner for 2-way associative cache as it did the 4-way associative cache in that each part of tag array 210 is associated with one set of cache array 200. Tag array 210 maintains at the same address location the tag which is associated with the data stored at a given location in cache array 200. In the particular configuration illustrated in FIG. 8A, the tag array 210 is divided into two sub-arrays, i.e. a top sub-array 210a-b and a bottom sub-array 210c-d, with each part being split into a right half and a left half. Each tag array part 210a, 210b, 210c, and 210d, stores a 16-bit tag which is ADDR 5-20 of the main memory address for a particular data element. Each tag array part 210a-d is capable of storing 128 tags. Thus, each tag stored in tag array part 210a, 210b, 210c, and 210d, is uniquely associated with the four data words, i.e. line, stored in the same address location indexed by the 7-bit address in the associated Set A1, Set B1, Set A2, Set B2 of cache array 200. For example, a particular 16-bit tag stored at location 45 in part 210a of tag array 210 is associated with the four data words, i.e. line, stored in cache array 200 in data cells 200a-d at address 45 for set A1.

Tag Responsive Cache Memory Address Controller

Referring to FIG. 8A, the tag responsive cache memory address controller will now be described. Tag responsive cache memory address controller 120 is hereinafter referred to as the cache reconfiguration controller. The cache reconfiguration controller 120 effectively reconfigures the tag array by effectively merging one or more of the least significant bits of the tag field, i.e. ADDR 5-20, of the main memory address, with line bits, i.e. ADDR 21-27, of the main memory address, resulting in a reconfigurable associative cache memory. The cache reconfiguration controller thereby permits converting the multi-way associative cache memory into either a larger size, fewer way associative cache memory or a smaller size, larger way, associative cache memory. In operation, the cache reconfiguration controller logically merges one or more of the least significant bits of the tag field of the main memory address and a reconfiguration designation, thereby controlling storage in the tag array by selectively disabling a portion of the tag array.

The number of the least significant bits of the tag field of the main memory address necessary to qualify the configuration line and thereby effectively merge the least significant bits of the tag field (ADDR 5-20) with the line field (ADDR 21-27) to control storage in the tag array is dependent upon the difference in the sizes of the maximum and the minimum ways in which the associative cache memory can be configured. Specifically, the necessary number of least significant bits of the tag field is dependent upon the exponents of $2^X$ to $2^Y$ way associative memory and is defined by Y-X.

When configured as 2-way associative cache, the cache reconfiguration controller logic only activates WRITE ENABLE line 327 for the top sub-array, i.e. tag array parts 210a-b, or WRITE ENABLE line 331 for the bottom sub-array, i.e. tag array parts 210c-d, at any given time. Therefore, only the top sub-array 210a-b or the bottom sub-array 210c-d of the tag array can be enabled for writing at one time. It is important to note that this is different than writing for 4-way associative cache because in 4-way cache, both the top sub-array 210a-b and bottom sub-array 210c-d are enabled for writing at the same time. It is understood by those having skill in the art of associative cache memories including tag or directory arrays that any number of replacement algorithms can be used to determine whether the left part or the right part of the top sub-array 210a-b or the bottom sub-array 210c-d is to be written with the new tag. The replacement algorithms commonly known to those having skill in the art include LRU (Least Recently Used).

Since the design of the cache reconfiguration controller of the present invention only enables the top sub-array 210a-b or the bottom sub-array 210c-d of the tag array to be written at any given time for a 2-way configuration, the pair of tags outputted from that part of the tag array which is not written can not equal the contents of the tag field, i.e. ADDR 5-20, of the main memory address. In other words, in a 2-way configuration, the output of the compare unit 220 for each of the two tags of the tag pair which was not rewritten in the tag array will cause the hit line to be inactive, i.e. HIT=0.

This result is obtained by using the least significant bits of the tag field, in this case, ADDR 20 and in the generic case, ADDR 20, 19, 18, etc., not only to determine which part of the tag array is to be written, but also as part of the tag value stored in the tag array. Thus, the least significant bits of the tag field impacts the comparison against the tag field from the main memory address in compare unit 220. Therefore, for 2-way associative cache, the two tag array parts which were not rewritten, i.e. the write enable line is non-active, will never have a least significant bit of the tag stored in these two tag array parts which is equal to the least significant bit in the tag field of the main memory address. In other words, the HIT lines for the two tags not written in 2-way associative cache will be inactive, i.e. HIT=0. As a result of the design of the reconfiguration controller, the tag array, and the cache array for 2-way associative cache, only tags of the tag pair from tag array parts 210a-b, i.e. Tag Set A1, B1, or tags of the tag pair from tag array parts 210c-d, i.e. Tag Set A2, B2, can result in HIT=1. However, unlike 2-way associative, any of the four tags, i.e. tags from the tag pair of tag array parts 210a-b, and tags from the tag pair of tag array parts 210c-d, may result in HIT=1.

An embodiment of logic design of the cache reconfiguration controller will now be described. The reconfiguration logic has three inputs, namely RELOAD 321, CONFIGURATION 322, and one or more least significant bits of the tag field, i.e. ADDR 5-20, of the main memory address. In this example, only one least significant bit, i.e. ADDR 20, of the tag field is used. For purposes of simplification of the example, the example addresses a 2-way associative memory to a 4-way associative memory, i.e. $2^1$ way to $2^2$ way associative memory. Since Y-X=1, only one bit of the least significant bits of the tag field of the main memory address is needed for purposes of the reconfiguration logic.

Generally, the reconfiguration logic uses the least significant tag field bits as well as the inversion of the least significant tag field bits thus activating only the upper or lower write enable line for tag array 210 for 2-way associative cache. In the present example, the configuration bit is set equal to zero, i.e. CONFIGURATION=0, for configuring the cache memory as a 2-way associative cache memory. Assuming address bit 20 equals zero, i.e. ADDR 20=0, INVERTER-gate 324 inverts address bit 20 from "0" to "1". The inputs for OR-gate 325 are CONFIGURATION=0 and ADDR 20(inverted)=1. The output of OR-gate 325 equals "1" which is in turn an input along with RELOAD 321 to AND-gate 326. If RELOAD=1, i.e. designating that the tag array is to be reloaded or updated, the output of AND-gate 326 equals "1", thereby activating write enable line 327 for the top sub-array, i.e. tag array parts 210a–b, of tag array 210. In other words, the reconfiguration logic combines the least significant tag field bits and a reconfiguration designation to selectively disable a portion of the tag array and the reload designation selectively prevents the operation of the result of this logic combination.

It will be understood by those having skill in the art that a replacement algorithm determines whether the left half, i.e. tag array part 210a, or the right half, i.e. tag array part 210b, is to be replaced. Any number of replacement algorithms known to those having skill in the art can be used including LRU (Least Recently Used).

ADDR 20, the least significant bit of the tag field of the main memory address, is one input and CONFIGURATION 322 is a second input to OR-gate 329. Since ADDR 20=0 and CONFIGURATION=0 (remembering that 2-way associative memory was selected), the output of OR-gate 329 equals "0". The output of OR-gate 329, i.e. "0", is one input for AND-gate 330 and RELOAD 321 is the second input for AND-gate 330. The output of AND-gate 330 equals "0" as a result of (output of OR-gate 329 equal "0") AND (RELOAD=1). Thus, write enable line 331 connected to tag array parts 210c–d is not active when the least significant bit of the tag field, i.e. ADDR 20, equals "0".

Continuing with the selection of the configuration as a 2-way associative cache memory and thus, CONFIGURATION=0, assume ADDR 20=1, i.e. the least significant bit of the tag field of the main memory address. Inverter gate 324 inverts the value of ADDR 20, thus resulting in the first input to OR-gate 325 equal "0". The second input of OR-gate 325 which is tied to the CONFIGURATION 322 also equals "0". Therefore, the output of OR-gate 325 equals "0" because ADDR 20 (inverted)=0 and CONFIGURATION=0. The output of OR-gate 325 is tied to one input of AND-gate 326 and RELOAD 321 is tied to the second input of AND-gate 326. Since the input line of AND-gate 326 which was tied to the output of OR-gate 325 has a value of "0" the output of AND-gate 326 is always "0" regardless of whether RELOAD 321 is active. Therefore, write enable line 327 is not active and nothing is written to tag array parts 210a–b for a 2-way associative memory when the least significant bit of the tag field, i.e. ADDR 20, equals "1".

At the same time, the inputs for OR-gate 329 are ADDR 20=1 and CONFIGURATION 322=0. The output of OR-gate 329 equals "1" because (ADDR=1) AND (CONFIGURATION=0)=0. The output of OR-gate 329 is tied to one input of AND-gate 330 and RELOAD 321 is tied to the second input of AND-gate 330. When RELOAD 321 is active, i.e. RELOAD=1, both inputs for AND-gate 330 equal "1" and, thus, the output of AND-gate 330 equals "1". Since the output of AND-gate 330 is tied to the write enable line 331, the write enable line is active resulting in tag array parts 210c–d being written for the 2-way associative cache memory. It will be understood by those having skill in the art that any number of replacement algorithms including LRU may be used to determine whether tag array part 210c, or tag array part 210d, of the bottom sub-array is to be replaced or overwritten. Therefore, when the least significant bit of the tag field equals "1", i.e. ADDR 20=1, the bottom sub-array is written, and the top sub-array 210a–b is not written.

Therefore, only tags having a least significant bit equal to "1" are written in tag array parts 210c and 210d, and only tags having a least significant bit equal to "0" are written in tag array parts 210a and 210b. As a result, when the least significant bit of the tag field of the main memory address equals "0", the two tags selected from tag array parts 210c and 210d will never result in HIT=1 and it is only possible for either the tag from tag array part 210a or tag array part 210b to possibly result in HIT=1. Similarly, when the least significant bit of the tag field of the main memory address equals "1", the two tags selected from tag array parts 210a and 210b respectively will always result in no hit, i.e. HIT=0, and only the tag selected from tag array parts 210c and 210d may possibly result in a hit, i.e. HIT=1.

To reconfigure the associative cache memory of the present invention as a 4-way associative cache memory, the configuration bit is set equal to "1", i.e. CONFIGURATION=1. Since CONFIGURATION=1, CONFIGURATION 322 is always active. Therefore, the outputs of OR-gate 325 and OR-gate 329 both equal "1". Furthermore, since the output of OR-gate 325 and OR-gate 329 are both directly tied to one input for AND-gate 326 and AND-gate 330, respectively, the output for AND-gate 326 and AND-gate 330 will always be equal to "1" when RELOAD 321 is active. Thus, write enable lines 327 and 331 will both be active when 4-way associative cache memory configuration is desired, i.e. CONFIGURATION=1. This results in tags being stored in any one of tag array parts 210a, 210b, 210c and 210d. The particular part tag array part 210a, 210b, 210c, or 210d to be overwritten is determined by any number of replacement algorithms known to those having skill in the art as previously discussed. As a result, since any of the four tag array parts may be written at any given time, any one of the four tag arrays selected from the four tag array parts may result in HIT=1 when 4-way associative cache is desired.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A reconfigurable cache memory system, which is responsive to a main memory address including a multibit tag field and a multibit line field, comprising:

a tag array which provides, in response to the multibit line field, a plurality of tag elements which are equal to a predetermined maximum set size into which the cache memory system is configured;

a tag element select logic circuit which selectively enables and disables writing of cache update data into selected portions of said tag array, by providing a write enable/disable signal to said tag array in response to a cache reconfiguration designation and at least one tag bit of said multibit tag field;

a plurality of tag comparators, each of which receives a corresponding one of the plurality of tag elements and the multibit tag field, each tag comparator asserting a corresponding tag hit signal when its received tag element matches the multibit tag field;

a data array which provides, in response to the multibit line field, a plurality of data elements, the plurality of data elements being equal to said predetermined maximum set size; and multiplexing means, which receives the plurality of data elements and the plurality of corresponding tag hit signals, for enabling access to a selected one of the plurality of data elements.

2. A reconfigurable cache memory system according to claim 1 wherein said tag element select logic circuit comprises:
an inverter which inverts said at least one tag bit of said multibit tag field;
a first OR gate which combines the inverted at least one tag bit and said cache reconfiguration designation to produce a first OR gate output;
a second OR gate which combines said at least one tag bit of said multibit tag field and said cache reconfiguration designation to produce a second OR gate output; and
means for connecting said first and second OR gate outputs to respective first and second portions of said tag array.

3. A reconfigurable cache memory system, which is responsive to a main memory address including a multibit tag field and a multibit line field, comprising:
a tag array which provides, in response to the multibit line field, a plurality of tag elements which are equal to a predetermined maximum set size into which the cache memory system is configured;
a tag element select logic circuit which selectively enables and disables writing of cache update data into selected portions of said tag array, by providing a write enable/disable signal to said tag array in response to a cache reconfiguration designation and at least one tag bit of said multibit tag field; and
a data array which provides, in response to the multibit line field, a plurality of data elements, the plurality of data elements being equal to said predetermined maximum set size.

4. A reconfigurable cache memory system according to claim 3 wherein said tag element select logic circuit comprises:
an inverter which inverts said at least one tag bit of said multibit tag field;
a first OR gate which combines the inverted at least one tag bit and said cache reconfiguration designation to produce a first OR gate output;
a second OR gate which combines said at least one tag bit of said multibit tag field and said cache reconfiguration designation to produce a second OR gate output; and
means for connecting said first and second OR gate outputs to respective first and second portions of said tag array.

5. A data processing system comprising:
a central processing unit;
a main memory which is responsive to a main memory address from said central processing unit, said main memory address including a multibit tag field and a multibit line field; and
a reconfigurable cache memory system, which is responsive to said main memory address from said central processing unit, said reconfigurable cache memory system comprising:
a tag array which provides, in response to the multibit line field, a plurality of tag elements which are equal to a predetermined maximum set size into which the cache memory system is configured;
a tag element select logic circuit which selectively enables and disables writing of cache update data into selected portions of said tag array, by providing a write enable/disable signal to said tag array in response to a cache reconfiguration designation and at least one tag bit of said multibit tag field;
a plurality of tag comparators, each of which receives a corresponding one of the plurality of tag elements and the multibit tag field, each tag comparator asserting a corresponding tag hit signal when its received tag element matches the multibit tag field;
a data array which provides, in response to the multibit line field, a plurality of data elements, the plurality of data elements being equal to said predetermined maximum set size; and
multiplexing means, which receives the plurality of data elements and the plurality of corresponding tag hit signals, for enabling access to a selected one of the plurality of data elements.

6. A data processing system according to claim 5 wherein said tag element select logic circuit comprises:
an inverter which inverts said at least one tag bit of said multibit tag field;
a first OR gate which combines the inverted at least one tag bit and said cache reconfiguration designation to produce a first OR gate output;
a second OR gate which combines said at least one tag bit and said cache reconfiguration designation to produce a second OR gate output; and
means for connecting said first and second OR gate outputs to respective first and second portions of said tag array.

7. A method of reconfiguring a cache memory system, which is responsive to a main memory address including a multibit tag field and a multibit line field, said cache memory system including a tag array which provides, in response to the multibit line field, a plurality of tag elements which are equal to a predetermined maximum set size into which the cache memory system is configured, said cache memory system also including a data array which provides, in response to the multibit line field, a plurality of data elements, the plurality of data elements being equal to said predetermined maximum set size, said method comprising the steps of:
selectively enabling and disabling writing of cache update data into selected portions of said tag array, by providing a write enable/disable signal to said tag array in response to a cache reconfiguration designation and at least one tag bit of said multibit tag field;
comparing a corresponding one of the plurality of tag elements and the multibit tag field, to assert a corresponding tag hit signal when the corresponding one of the plurality of tag elements matches the multibit tag field; and
multiplexing the plurality of data elements and the plurality of corresponding tag hit signals, to enable access to a selected one of the plurality of data elements.

8. A method according to claim 7 wherein said selectively enabling and disabling step comprises the steps of:
inverting said at least one tag bit of said multibit tag field;
logically ORing the inverted at least one tag bit and said cache reconfiguration designation to produce a first output;
logically ORing said at least one tag bit of said multibit tag field and said cache reconfiguration designation to produce a second output; and
providing said first and second outputs to respective first and second portions of said tag array.

9. A method of reconfiguring a cache memory system, which is responsive to a main memory address including a multibit tag field and a multibit line field, said cache memory system including a tag array which provides, in response to the multibit line field, a plurality of tag elements which are equal to a predetermined maximum set size into which the cache memory system is configured, said cache memory system also including a data array which provides, in response to the multibit line field, a plurality of data elements, the plurality of data elements being equal to said predetermined maximum set size, said method comprising the step of:

selectively enabling and disabling writing of cache update data into selected portions of said tag array, by providing a write enable/disable signal to said tag array in response to a cache reconfiguration designation and at least one tag bit of said multibit tag field.

10. A method according to claim 9 wherein said selectively enabling and disabling step comprises the steps of:

inverting said at least one tag bit of said multibit tag field;

logically ORing the inverted at least one tag bit and said cache reconfiguration designation to produce a first output;

logically ORing said at least one tag bit of said multibit tag field and said cache reconfiguration designation to produce a second output; and providing said first and second outputs to respective first and second portions of said tag array.

* * * * *